July 26, 1949.  A. W. OEHLER  2,477,199
TRACTOR MOUNTED IMPLEMENT
Filed June 22, 1944  2 Sheets-Sheet 1

FIG. I

INVENTOR.
ALVIN W. OEHLER

WITNESS

ATTORNEYS

July 26, 1949. A. W. OEHLER 2,477,199
TRACTOR MOUNTED IMPLEMENT
Filed June 22, 1944 2 Sheets-Sheet 2

INVENTOR.
ALVIN W. OEHLER

WITNESS
E. B. Bjurstrom

ATTORNEYS

Patented July 26, 1949

2,477,199

UNITED STATES PATENT OFFICE 2,477,199

TRACTOR MOUNTED IMPLEMENT

Alvin W. Oehler, Moline, Ill., assignor to Deere & Company, Moline, Ill., a corporation of Illinois Application June 22, 1944, Serial No. 541,572

3 Claims. (Cl. 56—20)

1

The present invention relates generally to tractor mounted implements and more particularly to a tractor mounted harvester and has for its principal object the provision of a novel and improved means for mounting a harvester, such as a harvester thresher or combine, on a tractor, providing for economy of materials and extreme flexibility in operation.

Due to the present scarcity of labor, considerable interest has been revived in harvesters of the self-propelled type, which are large in capacity but can be operated by a single operator. Most of the present self-propelled harvesters such as combines are large expensive machines which have their own power plant, and are designed for one operation only, that is, harvesting grain. In normal times, this type of machine is economical only for operators of large farms or for the custom operator, and is not practical for owners of medium sized farms for the reason that the machine is used for a comparatively few number of days in a year. Therefore, a specific object of my invention relates to the provision of a harvester of comparatively large capacity, which can be detachably mounted on a tractor, providing the flexibility of operation of a conventional self-propelled combine, while preserving the characteristic that the combine can be removed from the tractor to permit the latter to be used for other operations during the remainder of the year. Although detachable tractor mounted combines have been proposed heretofore, the proposed arrangements have not been suitable for large capacity machines, which is one of the features of the present invention.

Figure 1:
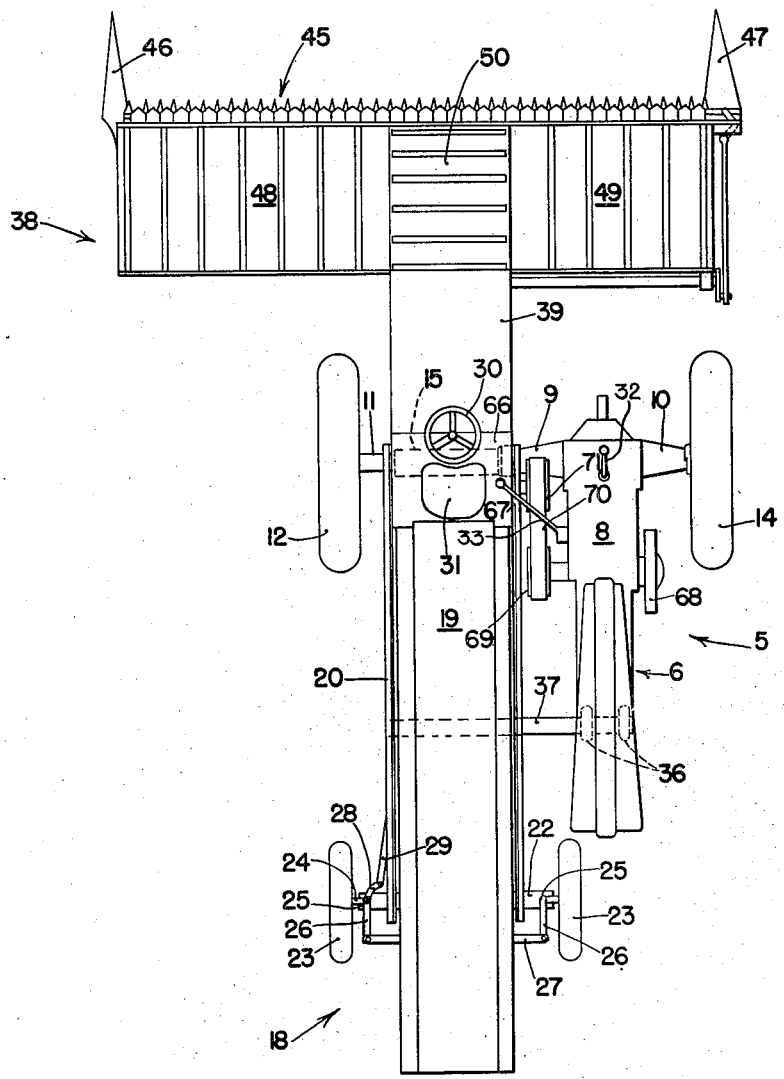

These and other objects and advantages of my invention will be apparent to those skilled in the art after a consideration of the following description, in which reference is had to the drawings appended hereto, in which Figure 1 is a plan view of a harvester thresher embodying the principles of the present invention.

Figure 2:
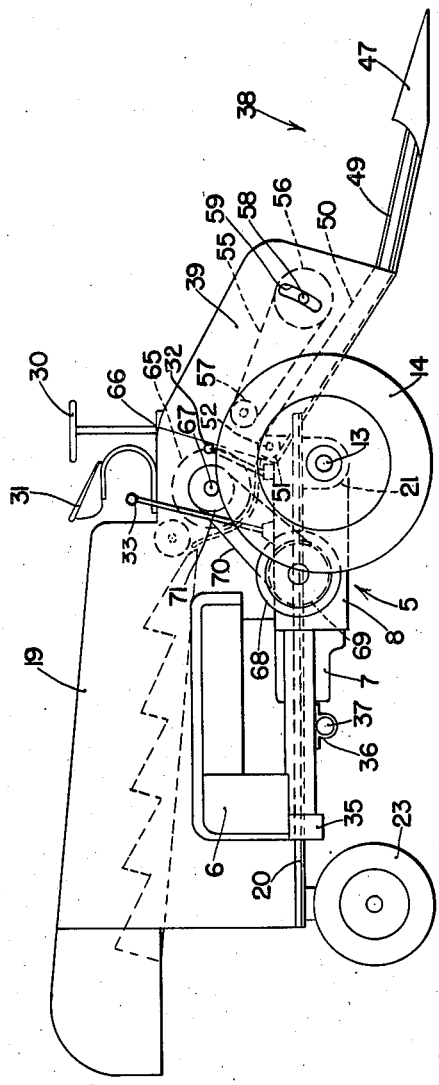

Figure 2 is a side elevational view of the implement.

Referring now to the drawings, the tractor is indicated in its entirety by reference numeral 5 and comprises a conventional type tractor having a narrow longitudinally extending body 6 including an engine 7, a transmission housing 8, and traction means including a pair of axle housings 9, 10 extending laterally from opposite sides of the transmission housing 8, respectively.

In accordance with the teachings of the present invention, one of the axle housings 9 is provided with a long extension housing 15, rigidly fixed thereto and within which is journaled an axle 11 carried at its outer end on a traction wheel 12. The other axle housing 10 is provided with the usual axle 13, the outer end of which is carried on a second traction wheel 14.

The implement shown here is a harvester thresher or combine and is indicated in its entirety by reference numeral 18 and comprises a longitudinally extending comparatively narrow thresher body or housing 19, mounted on a supporting frame 20, the wheel-less forward or leading end of which is provided with a supporting bracket 21 which is mounted on the tractor axle housing 9 and extension 15. The rear or trailing end of the harvester frame 20 is mounted on and sustained by ground-engaging means including a transverse axle 22 which is carried at opposite ends, respectively, on a pair of dirigible wheels 23, disposed on opposite sides of the combine body 19, respectively. Each of the wheels 23 is journaled on an axle member 24, which is mounted on a conventional king pin 25 having a rearwardly extending crank arm 26. The two crank arms 26 are interconnected by a transverse link 27, and one of the king pins 25 is provided with a steering arm 28, which is connected through a steering link 29 with a steering control means including wheel 30 mounted above the forward end of the thresher body 19, at the operator's station. A seat 31 is mounted on top of the body 19 behind the steering wheel 30 for the operator's convenience. The tractor is provided with a conventional gear shift control lever 32 and a conventional hand operated clutch lever 33, both of which are accessible to the operator on the seat 31.

The usual dirigible wheels are removed from the steering post 35 of the tractor and the wheelless trailing end portion of the body 6 of the tractor is supported by means of suitable brackets 36 on a transversely disposed beam 37, which extends beneath and is rigidly fixed to the implement frame 20 and projects laterally from the side of the implement body 19 to carry the tractor body 6 on the implement body 19.

The combine 18 is provided with a harvester platform 38, which is carried at the forward end of a longitudinally extending feeder house 39, which extends forwardly from the front end of the thresher body 19. The platform 38 is disposed transversely across the forward end of the feeder housing 39 and in front of the tractor axle housings 9, 10, so that the platform is at least coextensive with the latter, but preferably extends laterally beyond at least one of the tractor traction wheels 12, 14. The transverse platform 38 is provided with a conventional cutter bar 45, extending across the full width of the platform, at opposite ends of which are mounted a pair of dividers 46, 47, respectively. Behind the cutter bar 45 is a pair of canvas platform conveyors 48, 49, trained over rollers (not shown) at opposite ends thereof, and operable in such a direction that the upper flight of each conveyor moves inwardly toward the feeder house. A longitudinally extending conveyor 50 extends from the cutter bar 45 rearwardly through the feeder house 39 and is trained around a drive roller 51 mounted on a shaft 52 at the rear end of the feeder house. The longitudinal conveyor 50 is coextensive with the width of the feeder house 39, and receives harvested crops from the two transverse conveyors 48, 49 and conveys the crops rearwardly, discharging them at the forward end of the thresher housing 19. The platform 38 and feeder house 39 are rigidly connected together and the entire structure is pivotally mounted on the forward end of the thresher housing 19 on the shaft 52, providing for vertical swinging movement about the axis of the rear roller 51 of the longitudinal conveyor 50.

A flexible feeder apron 55 is disposed within the feeder house 39 above the conveyor 50 and is trained around a pair of front and rear rollers 56, 57. The feeder roller 56 is journaled on a shaft 58 which is shiftable vertically within arcuate slots 59 in the sides of the feeder house 39, thereby permitting the feeder 55 to swing vertically about the axis of the rear roller 57 to accommodate varying amounts of harvested material as the latter is carried rearwardly into the feeder house by the conveyor 50.

A crop treating cylinder in the form of a threshing cylinder 65 is mounted in the forward end of the thresher housing 19 approximately beneath the operator's platform 66, and is provided with a drive shaft 67 which extends laterally from the side of the thresher body 19 adjacent the tractor body 6. The tractor 5 is preferably of the type having a transversely disposed crankshaft extending laterally from opposite sides of the tractor body 6, and carrying a flywheel 68 on one end and a belt pulley 69 on the other end. A power transmitting belt 70 is trained over the belt pulley 69 and over a pulley 71 on the outer end of the cylinder shaft 67 for driving the latter from the tractor engine 7.

During operation, the tractor is normally operated in reverse, that is to say, with the axle housings 9, 10 ahead and the body 6 extending rearwardly therefrom. This can be accomplished either by operating the tractor in reverse gear, or by temporarily installing an additional gear in the gear transmission to permit the use of the multiple change gears of the tractor in this direction of operation. Such an arrangement is disclosed and claimed in Patent 2,309,199, granted January 26, 1943 to McCormick.

Since only a portion of the combine is carried on the tractor, the remainder being carried on its own wheels 23, the combine can be of comparatively large dimensions and capacity. With the dirigible wheels 23 at the rear end of the body 19, the implement can be controlled with extreme flexibility, and is capable of making sharp turns, with the result that a highly efficient harvesting operation can be performed. The front mounted cutter bar 45 can be pushed up into the fence corners, so that all of the grain can be harvested without any hand work. Inasmuch as the tractor body 6 is supported on the implement body 19 by means of the transverse beam 37, the two bodies can be controlled as one, so that the machine is the equivalent of any self-propelled combine known to those skilled in the art.

However, at the end of the harvesting season, the combine body 19 can be detached from the tractor by removing the brackets 21, 36 from the tractor, and the latter can be reconditioned for other duties about the farm, by merely replacing the dirigible wheels on the steering post 35 and removing the extension axle 11 and housing 15, after disconnecting the power connection 70.

I claim:

1. A tractor and agricultural machine unit, comprising: a tractor of the type having a longitudinal body normally carried at one end on steerable wheel means and at its other end on ground-engaging traction means including opposite, laterally outwardly extending housing elements, said tractor being operated herein in a reverse direction with the traction means leading and the body trailing and with the steerable wheel means removed; an agricultural machine having a longitudinal body disposed along one side of the tractor body and having a wheel-less leading end portion adjacent to the proximate housing element at that side of the tractor and further having a trailing end portion proximate to the wheel-less trailing end of the tractor body; means cooperative between the leading end portion of the agricultural machine body and the aforesaid proximate housing element and sustaining the former on the latter; ground-engaging steerable wheel means below and connected to the trailing end portion of the agricultural machine body and independent of the tractor for sustaining said trailing end of the agricultural machine body; steering control means on one of the bodies and connected to said steerable wheels; and normally laterally and vertically rigid means connected to the agricultural machine body intermediate its leading and trailing end portions and to the trailing end portion of the tractor body for sustaining the latter on the former.

2. The invention defined in claim 1, further characterized in that: the trailing end portion of the agricultural machine body includes a supporting portion which is projected longitudinally in a trailing direction a substantial distance beyond the trailing end portion of the tractor body; and said steerable wheels are below and sustain said projected portion so that the wheel base of the unit is substantially greater than that obtainable by use of the tractor as normally equipped.

3. A tractor and combine unit, comprising: a conventional tractor of the type having a longitudinal body normally carried at one end on steerable wheel means and at its other end on ground-engaging traction means including opposite, laterally outwardly extending housing elements, said tractor being operated herein in a reverse direction with the traction means leading and the body trailing and with the steerable wheel means removed; a combine having a longitudinal body disposed along one side of the tractor body and having a wheel-less leading end portion adjacent to the proximate housing element at that side of the tractor and further having a trailing end portion proximate to the wheel-less trailing end of the tractor body; means cooperative between the leading end portion of the combine body and the aforesaid proximate housing element and sustaining the former on the latter; ground-engaging steerable wheel means below and connected to the trailing end portion of the combine body and independent of the tractor for sustaining said trailing end of the combine body; steering control means on one of the bodies and connected to said steerable wheels; normally laterally and vertically rigid means connected to the combine body intermediate its leading and trailing end portions and to the trailing end portion of the tractor body for sustaining the latter on the former; and crop-harvesting means supported by at least one of the bodies and disposed ahead of the traction means of the tractor and extending transversely across and ahead of the combine body.

ALVIN W. OEHLER.

REFERENCES CITED

The following references are of record in the file of this patent:

UNITED STATES PATENTS

| Number | Name | Date |
|---|---|---|
| 2,318,409 | Millard et al. | May 4, 1943 |
| 2,369,745 | Millard et al. | Feb. 20, 1945 |
| 2,376,539 | Hitchcock et al. | May 22, 1945 |